United States Patent
Joshi et al.

(10) Patent No.: US 12,368,906 B2
(45) Date of Patent: Jul. 22, 2025

(54) CODING OF DISPLACEMENTS USING SKEW FLAG FOR VERTEX MESH (V-MESH)

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 60 days.

(21) Appl. No.: 18/511,315

(22) Filed: Nov. 16, 2023

(65) Prior Publication Data

US 2024/0171786 A1    May 23, 2024

Related U.S. Application Data

(60) Provisional application No. 63/426,151, filed on Nov. 17, 2022.

(51) Int. Cl.
*H04N 21/2343* (2011.01)
*H04N 21/4402* (2011.01)

(52) U.S. Cl.
CPC ..... *H04N 21/2343* (2013.01); *H04N 21/4402* (2013.01)

(58) Field of Classification Search
CPC .................................................. H04N 21/2343
USPC ..................................................... 375/240.01
See application file for complete search history.

(56) References Cited

U.S. PATENT DOCUMENTS

2022/0053224 A1*    2/2022    Katsumata .............. G06F 3/013

OTHER PUBLICATIONS

"V-Mesh Test Model v1," WG 7, MPEG 3D Graphics and Haptics Coding, ISO/IEC JTC 1/SC 29/WG 7 N00404, Jul. 2022, 15 pages.
"WD 2.0 of V-DMC," MPEG 3D Graphics and Haptics Coding, ISO/IEC JTC 1/SC 29/WG 7 N00546, Jan. 2023, 76 pages.
"WD 3.0 of V-DMC," MPEG 3D Graphics and Haptics Coding, ISO/IEC JTC 1/SC 29/WG 07 N00611, Apr. 2023, 142 pages.
"WD 4.0 of V-DMC," MPEG 3D Graphics and Haptics Coding, ISO/IEC JTC 1/SC 29/WG 07 N00611, Aug. 2023, 145 pages.

* cited by examiner

*Primary Examiner* — Amir Shahnami (57) ABSTRACT

An apparatus includes a communication interface and a processor operably coupled to the communication interface. The processor is configured to form an LOD signal corresponding to a displacement field. The processor is further configured to identify one or more samples of the LOD signal. The processor is further configured to determine whether a set of values of the one or more samples has a positive skew or a negative skew and set a skew flag. The processor is further configured to convert the set of values to a set of unsigned symbols according to the determined positive skew or negative skew. The processor is further configured to perform binarization on the converted set of values. The processor is further configured to produce an output bitstream including encoding the LOD signal using the converted and binarized set of values and encoding the skew flag in the output bitstream.

20 Claims, 8 Drawing Sheets

CODING OF DISPLACEMENTS USING SKEW FLAG FOR VERTEX MESH (V-MESH)

CROSS-REFERENCE TO RELATED APPLICATION AND PRIORITY CLAIM

This application claims priority under 35 U.S.C. § 119(e) to U.S. Provisional Patent Application No. 63/426,151 filed on Nov. 17, 2022, which is hereby incorporated by reference in its entirety.

TECHNICAL FIELD

This disclosure relates generally to multimedia devices and processes. More specifically, this disclosure relates to improved coding of displacements using a skew flag for vertex mesh (V-MESH).

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

SUMMARY

This disclosure provides improved coding of displacements using a skew flag for vertex mesh (V-MESH).

In a first embodiment, an apparatus includes a communication interface and a processor operably coupled to the communication interface. The processor is configured to form a level of detail (LOD) signal corresponding to a displacement field. The processor is also configured to identify one or more samples of the LOD signal. The processor is also configured to determine whether a set of values of the one or more samples has a positive skew or a negative skew and set a skew flag according to the determined positive or negative skew. The processor is also configured to convert the set of values of the one or more samples to a set of unsigned symbols according to the determined positive skew or negative skew. The processor is also configured to perform binarization on the converted set of values of the one or more samples. The processor is also configured to produce an output bitstream including encoding the LOD signal using the converted and binarized set of values of the one or more samples and encoding the skew flag in the output bitstream.

In a second embodiment, a method includes forming a level of detail (LOD) signal corresponding to a displacement field. The method also includes identifying one or more samples of the LOD signal. The method also includes determining whether a set of values of the one or more samples has a positive skew or a negative skew and setting a skew flag according to the determined positive or negative skew. The method also includes converting the set of values of the one or more samples to a set of unsigned symbols according to the determined positive skew or negative skew. The method also includes performing binarization on the converted set of values of the one or more samples. The method also includes producing an output bitstream including encoding the LOD signal using the converted and binarized set of values of the one or more samples and encoding the skew flag in the output bitstream.

In a third embodiment, an apparatus includes a communication interface and a processor operably coupled to the communication interface. The processor is configured to receive a compressed bitstream of a level of detail (LOD) signal corresponding to a displacement field. The processor is also configured to decode the compressed bitstream and identify a skew flag and a set of binary values associated with one or more samples of the LOD signal. The processor is also configured to map the set of binary values to a set of unsigned symbols. The processor is also configured to convert the set of unsigned symbols to a set of signed values associated with the one or more samples of the LOD signal based on a value of the skew flag.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

A point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud, often requires specialized hardware. To avoid specialized hardware to compress a 3D point cloud, a 3D point cloud can be transformed into traditional two-dimensional (2D) frames and that can be compressed and later reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

As part of an encoding process, a base mesh can be coded using an existing mesh codec, and a reconstructed base mesh can be constructed from the coded original mesh. The reconstructed base mesh can then be subdivided into one or more subdivided meshes and a displacement field is created for each subdivided mesh. For example, if the reconstructed base mesh includes triangles covering the surface of the 3D object, the triangles are subdivided according to a number of subdivision levels, such as to create a first subdivided mesh in which each triangle of the reconstructed base mesh is subdivided into four triangles, a second subdivided mesh in which each triangle of the reconstructed base mesh is subdivided into sixteen triangles, and so on, depending on how many subdivision levels are applied. Each displacement field represents the difference between vertex positions of the original mesh and the subdivided mesh associated with the displacement field. Each displacement field is wavelet transformed to create level of detail (LOD) signals that are encoded as part of a compressed bitstream. During decoding, the displacements of each displacement field are added to their associated subdivided mesh to recreate the original mesh.

The quantized LOD signals can be packed into a 2D image/video, and can be compressed losslessly (or in a lossy manner) by using an image/video encoder, such as an HEVC encoder. This process typically uses an additional instance of a video encoder/decoder. This disclosure provides for directly entropy coding the quantized LOD signals to achieve improved compression efficiency. Some attempts have been made to use entropy coding, but, in such attempts, the sign of the displacement coefficient is coded separately. This leads the binarization of the displacement coefficient to be symmetric around zero. However, the histogram of the displacement coefficient for a given LOD level indicates that the distribution is often skewed in positive or negative direction. In such cases, using symmetric binarization results in a loss of coding efficiency.

This disclosure provides for the coding of the quantized LOD signal directly using an entropy coder, while taking advantage of the fact that the histogram of displacement coefficients at a given LOD level is often sked in positive or negative direction. To account for this, various embodiments of this disclosure cause a flag to be sent that indicates the positive or negative skew and binarization can thus be varied based on the value of the flag. This disclosure further provides that displacement values can be converted to unsigned symbols based on the determined positive or negative skew prior to binarization and for efficient coding of the values into the bitstream.

Figure 1:
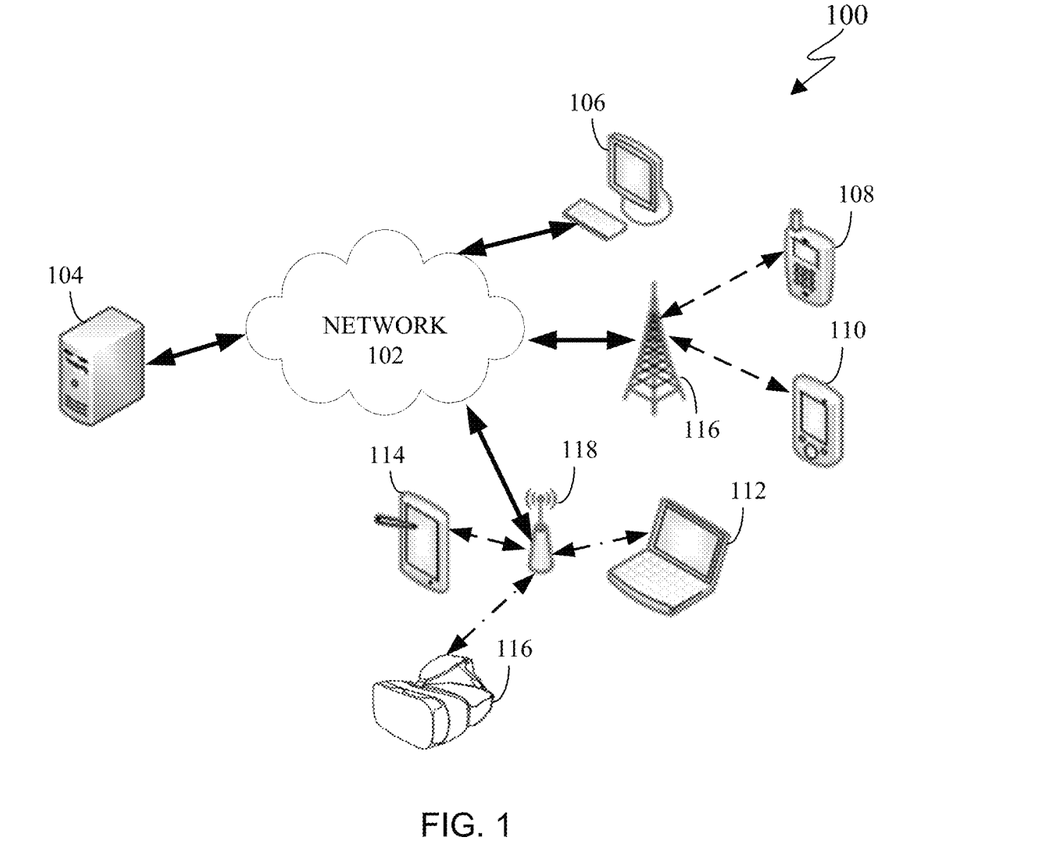
FIG. 1 illustrates an example communication system in accordance with this disclosure.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder. In certain embodiments, the server 104 can utilize improved displacements coding using a skew flag as described in this disclosure.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can compress a 3D point cloud or mesh to generate a bitstream and then transmit the bitstream to one or more of the client devices 106-116. As another example, one of the client devices 106-116 can compress a 3D point cloud or mesh to generate a bitstream and then transmit the bitstream to another one of the client devices 106-116 or to the server 104. In accordance with this disclosure, the server 104 and/or the client devices 106-116 can utilize improved displacements coding using a skew flag as described in this disclosure.

Although FIG. 1 illustrates one example of a communication system 100, various changes can be made to FIG. 1. For example, the communication system 100 could include any number of each component in any suitable arrangement.

In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
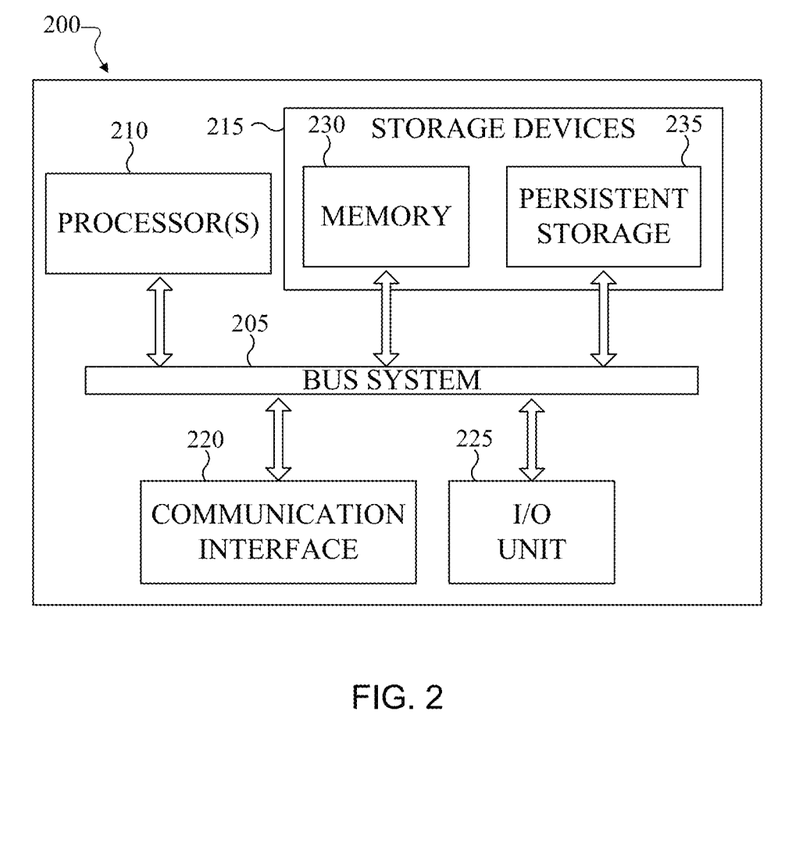
FIGS. 2 and 3 illustrate example electronic devices in accordance with this disclosure.
Figure 3:
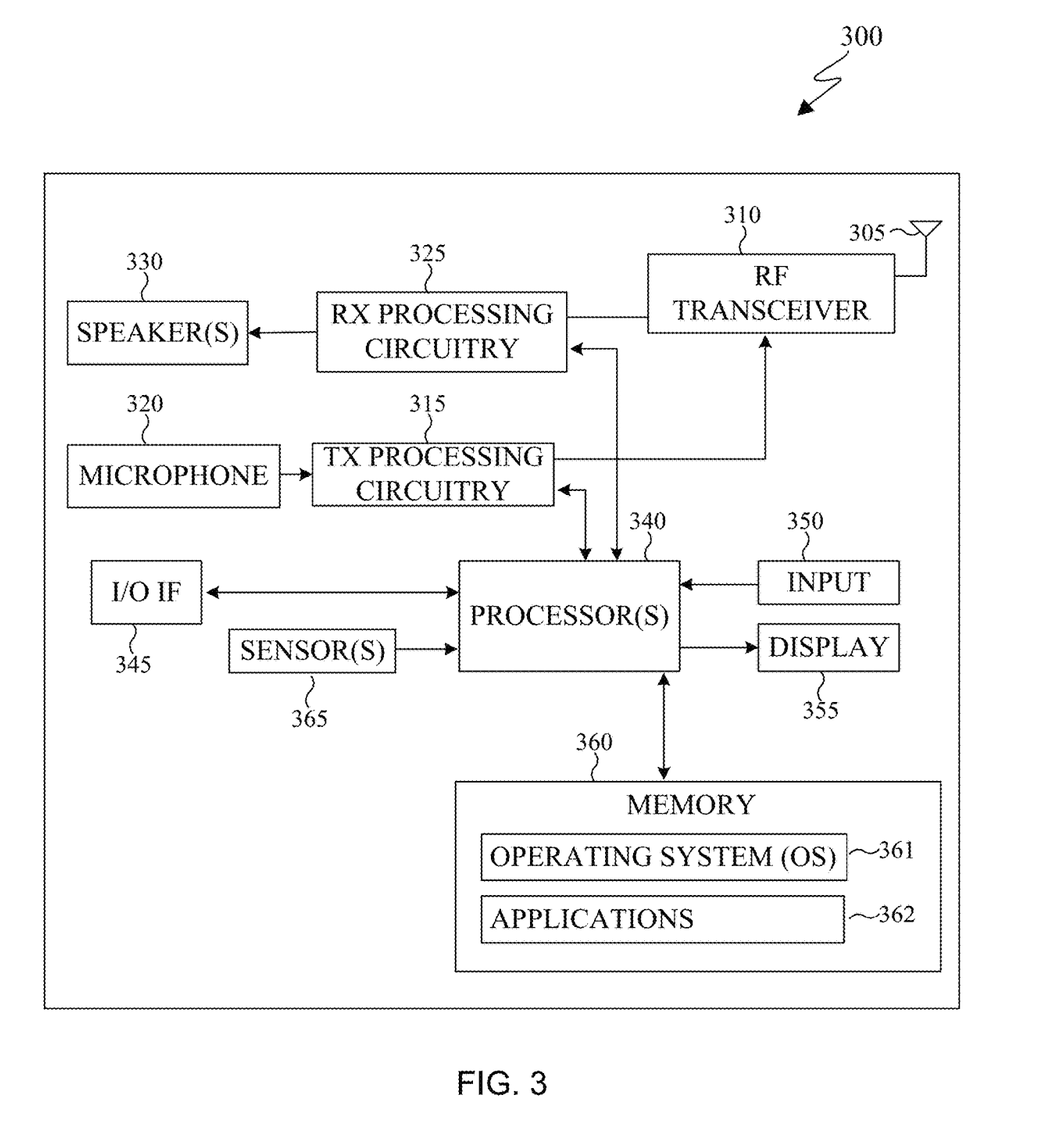

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can utilize improved displacements coding using a skew flag as described in this disclosure.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can utilize improved displacements coding using a skew flag as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
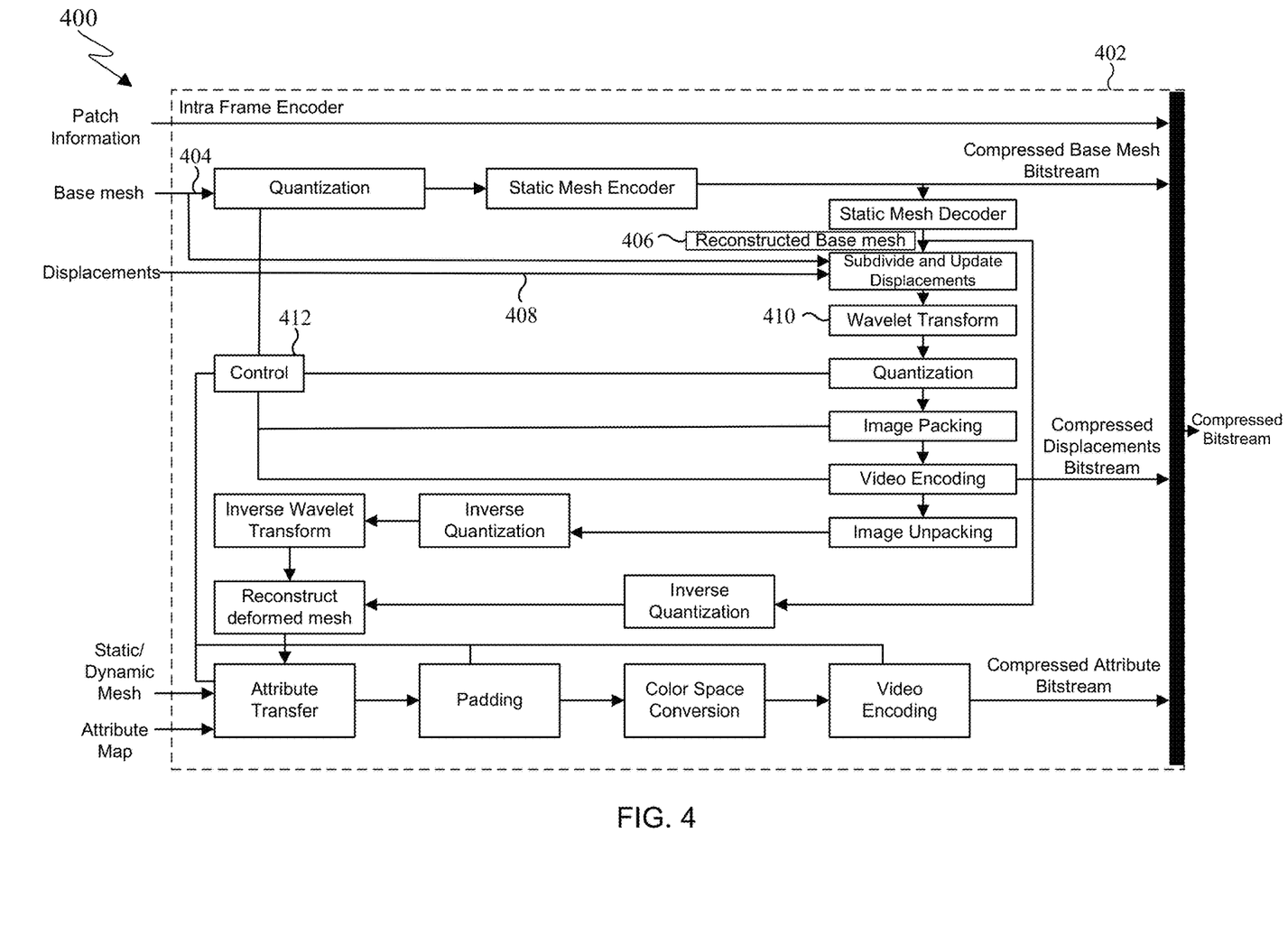
FIG. 4 illustrates an example intra-frame encoding process in accordance with this disclosure.

FIG. 4 illustrates an example intra-frame encoding process 400 in accordance with this disclosure. The intra-frame encoding process 400 illustrated in FIG. 4 is for illustration only. FIG. 4 does not limit the scope of this disclosure to any particular implementation of an intra-frame encoding process.

As shown in FIG. 4, the intra-frame encoding process 400 encodes a mesh frame using an intra-frame encoder 402. The intra-frame encoder 402 can be represented by, or executed by, the server 200 shown in FIG. 2 or the electronic device 300 shown in FIG. 3. A base mesh 404, which typically has a smaller number of vertices compared to the original mesh, is created and is quantized and compressed in either a lossy or lossless manner, and then encoded as a compressed base mesh bitstream. As shown in FIG. 4, a static mesh decoder decodes and reconstructs the base mesh, providing a reconstructed base mesh 406. This reconstructed base mesh 406 then undergoes one or more levels of subdivision and a displacement field is created for each subdivision representing the difference between the original mesh and the subdivided reconstructed base mesh. In inter-coding of a mesh frame, the base mesh 404 is coded by sending vertex motions instead of compressing the base mesh directly. In either case, a displacement field 408 is created. Each displacement of the displacement field 408 has three components, denoted by x, y, and z. These may be with respect to a canonical coordinate system or a local coordinate system where x, y, and z represent the displacement in local normal, tangent, and bi-tangent directions. It will be understood that multiple levels of subdivision can be applied, such that a displacement field for each subdivision level is also created.

Let the number of 3-D displacement vectors in a displacement 408 of a mesh-frame be N. Let the displacement field be denoted by $d(i)=[d_x(i), d_y(i), d_z(i)]$, $0 \leq i < N$. The displacement fields 408 undergo one or more levels of wavelet transformation 410 to create level of detail (LOD) signals $d^k(i)$, $i=0 \leq i < N^k$, $0 \leq k < \text{numLOD}$, where k denotes the index of the level of detail, $N^k$ denotes the number of samples in the level of detail signal at level k, and numLOD denotes the number of LODs. The LOD signals $d^k(i)$ may be scalar quantized.

As shown in FIG. 4, the quantized LOD signals corresponding to the displacement fields 408 are coded into a compressed bitstream. In various embodiments, the quantized LOD signals are packed into a 2D image/video using an image packing operation, and are compressed losslessly by using an image or video encoder. However, it is possible to use another entropy coder such as an asymmetric numeral systems (ANS) coder or a binary arithmetic entropy coder to code the quantized LOD signals. For example, "Arithmetic Coding of Displacements for Subdivision-based Mesh Compression," ISO/IEC SC29 WG07 M60300, July 2022, which is incorporated by reference in its entirety as if fully set forth herein, describes using binary arithmetic entropy coder to code the quantized LOD signals. Also, U.S. patent application Ser. No. 18/447,191, which is incorporated by reference in its entirety as if fully set forth herein, describes coding using contexts based on prior displacement values. Various other documents on standards have been proposed with respect to vertex mesh (V-MESH) and dynamic mesh coding. The following documents are hereby incorporated by reference in their entirety as if fully set forth herein:

"V-Mesh Test Model v1," ISO/IEC SC29 WG07 N00404, July 2022.

"WD 2.0 of V-DMC," ISO/IEC SC29 WG07 N00546, January 2023.

"WD 3.0 of V-DMC," ISO/IEC SC29 WG07 N00611, April 2023.

"WD 4.0 of V-DMC," ISO/IEC JTC 1/SC 29/WG 07 N00611, August 2023.

There may be other dependencies based on previous samples, across components, and across LODs that may be exploited.

As also shown in FIG. 4, image unpacking of the LOD signals is performed and an inverse quantization operation and an inverse wavelet transform operation are performed to reconstruct the LOD signals. Another inverse quantization operation is performed on the reconstructed base mesh 406, which is combined with the reconstructed LOD signals to reconstruct a deformed mesh. An attribute transfer operation is performed using the deformed mesh, a static/dynamic mesh, and an attribute map. A point cloud is a set of 3D points along with attributes such as color, normals, reflectivity, point-size, etc. that represent an object's surface or volume. These attributes are encoded as a compressed attribute bitstream. As shown in FIG. 4, the encoding of the compressed attribute bitstream may also include a padding operation, a color space conversion operation, and a video encoding operation. The various functions or operations shown in FIG. 4 can be controlled by a control process 412. The intra-frame encoding process 400 outputs a compressed bitstream that can, for example, be transmitted to, and decoded by, an electronic device such as the server 104 or the client devices 106-116. As shown in FIG. 4, the output compressed bitstream can include the compressed base mesh bitstream, the compressed displacements bitstream, and the compressed attribute bitstream.

Although FIG. 4 illustrates a block diagram of an example intra-frame encoding process 400, various changes may be made to FIG. 4. For example, the number and placement of various components of the intra-frame encoding process 400 can vary as needed or desired. In addition, the intra-frame encoding process 400 may be used in any other suitable process and is not limited to the specific processes described above. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement field 408. As another example, the intra-frame encoding process 400 of FIG. 4 can include improved coding of displacements using a skew flag, as described in this disclosure.

Figure 5:
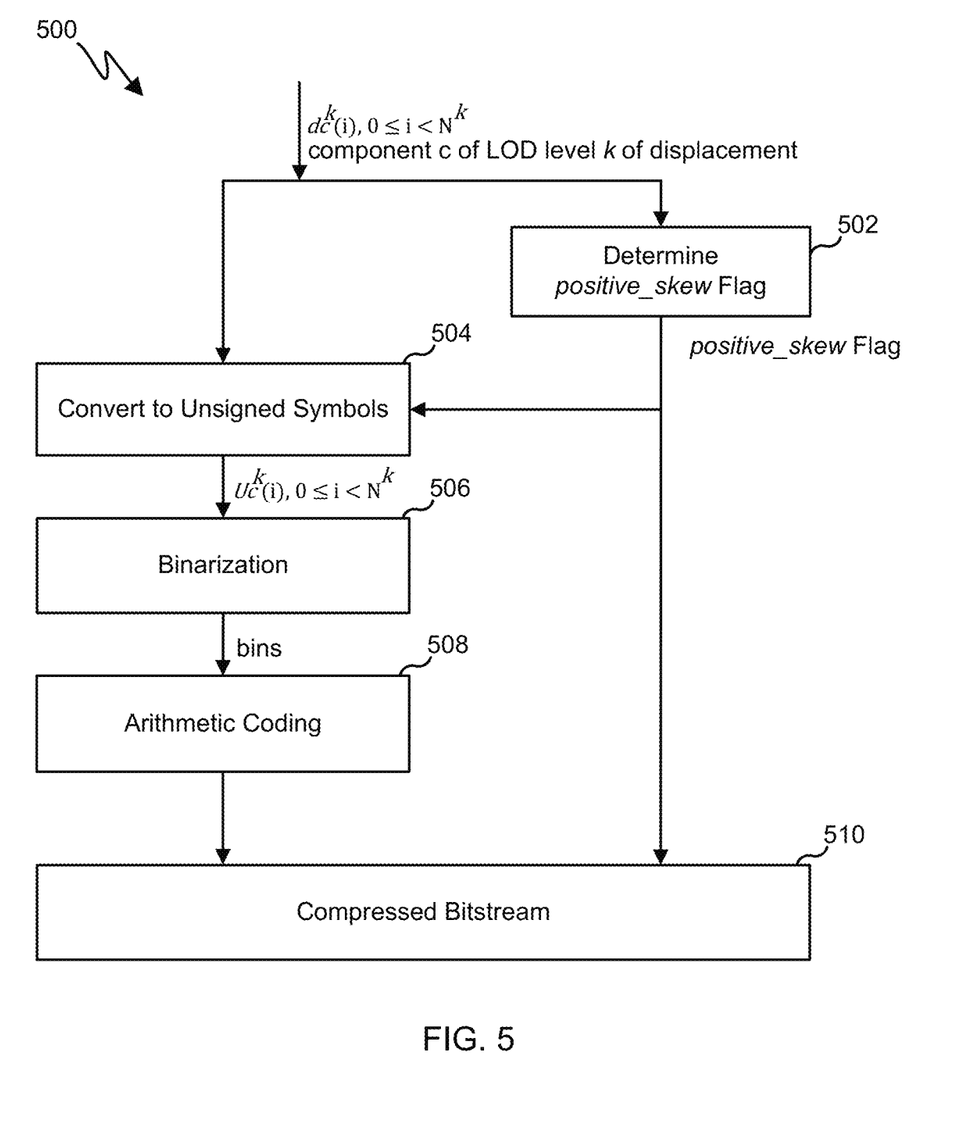
FIG. 5 illustrates an example displacement coding process in accordance with this disclosure.

FIG. 5 illustrates an example displacement coding process 500 in accordance with this disclosure. The displacement coding process 500 illustrated in FIG. 5 is for illustration only. FIG. 5 does not limit the scope of this disclosure to any particular implementation of a displacement coding process. For ease of explanation, the process 500 of FIG. 5 may be described as being performed using the electronic device 300 of FIG. 3. However, the process 500 may be used with any other suitable system and any other suitable electronic device, such as the server 200.

As described above, during encoding, the quantized LOD signals corresponding to the displacement fields are coded into a compressed bitstream. In various embodiments, the quantized LOD signals are packed into a 2D image/video using an image packing operation, and are compressed losslessly (or in a lossy manner) by using an image or video encoder. It is also possible to use another entropy coder such as an ANS coder or a binary arithmetic entropy coder to code the quantized LOD signals.

For example, let a sample forming a quantized LOD signal have the value d, which is a signed integer. Then, d is first binarized as follows. A greater_than_0 flag is coded indicating whether d is greater than 0. If (d>0), a sign flag is coded which specifies the sign of d. Then a greater_than_1 flag is coded to indicate whether the absolute value of d, abs(d), is greater than 1. If abs(d)>1, (abs(d)−2) can be coded, such as using exponential Golomb code of order 0. The term "coded" is used to indicate binarization to one or more bins. After binarization, the bins are coded using binary arithmetic coder to create compressed bits. Table 1, below, shows the binarization for different values of (abs (d)−2). For abs(d)>1, in addition to the binarization shown in Table 1, additional bins, 1s1, are also coded as a prefix, where s is the bin corresponding to the sign.

TABLE 1

Binarization of abs(d) − 2

| abs(d) − 2 | Prefix (unary) | Suffix (fixed length) | Suffix range |
|---|---|---|---|
| 0 | 0 | — | — |
| 1-2 | 10 | X | 0 to 1 |
| 3-6 | 110 | XX | 0 to 3 |
| 7-14 | 1110 | XXX | 0 to 7 |
| . . . | . . . | . . . | . . . |

This binarization is symmetrical with respect to the sign in that the binarization of +abs(d), and −abs(d) contains the same number of bins.

However, when the histograms of quantized LOD signals are analyzed, it is found that the distribution is often skewed in the positive or negative direction. To exploit this property, the process 500 includes determining and sending a flag to indicate the skews towards negative values or positive values and then varying the binarization based on the value of the flag. As shown in FIG. 5, for each component c for LOD level k of a displacement field, a positive or negative skew of the component values and a corresponding skew flag can be determined based on the histogram of the symbols of an LOD component at step 502. The flag can be denoted as "positive_skew," "skew," or other names. A value of 1 (or true) indicates that the distribution is skewed towards positive values whereas a value of 0 (or false) indicates that the distribution is skewed towards negative values.

Depending on the value of the positive_skew flag, the quantized displacement d is mapped to an unsigned value u at step 504. The mapping of values for the quantized displacements d to the unsigned values u varies depending on the skew flag. For example, the mapping can vary based on the following scheme:

$$u = \begin{cases} 2*d - \text{positive\_skew}, & d \geq 0 \\ 2*(-d) - 1 + \text{positive\_skew}, & d < 0 \end{cases}$$

This mapping is also shown, for example, in Table 2, below.

TABLE 2

Example Mapping Based on Skew Flag

| positive_skew flag = 1 | | | | | | | | |
|---|---|---|---|---|---|---|---|---|
| d | 0 | 1 | −1 | 2 | −2 | 3 | −3 | . . . |
| u | 0 | 1 | 2 | 3 | 4 | 5 | 6 | . . . |
| positive_skew flag = 0 | | | | | | | | |
| d | 0 | −1 | 1 | −2 | 2 | −3 | 3 | . . . |
| u | 0 | 1 | 2 | 3 | 4 | 5 | 6 | . . . |

As shown above, all values of d, even if it is a negative value, are mapped to a positive (unsigned) value for u. After mapping the displacement values d to the unsigned values u, the values of u may be binarized at step 506 and coded at step 508 using arithmetic coding such as using an exponential Golomb code, Golomb-Rice code, unary code, truncated unary code, or a concatenation of a Golomb Rice code and exponential Golomb code. For example, in some embodiments, a concatenation of Golomb Rice code of order 0 and exponential Golomb code of order 0 can be used, as shown in Table 3 below.

TABLE 3

Example Binarization of Unsigned Values

| | Binarization | | |
|---|---|---|---|
| u | Prefix (unary) | Suffix (fixed length) | Suffix range |
| 0 | 0 | — | — |
| 1 | 10 | — | — |
| 2 | 110 | — | — |
| 3-4 | 1110 | X | 0 to 1 |
| 5-8 | 11110 | XX | 0 to 3 |
| 9-16 | 111110 | XXX | 0 to 7 |
| . . . | . . . | . . . | . . . |

As shown above, here, the transition from Golomb Rice code to exponential Golomb code may be considered at u=2.

It will be understood that other transition points can be used. For example, in some embodiments, use of a different transition point (u=3) can be used, such as shown in Table 4 below.

TABLE 4

Example Binarization of Unsigned Values

| | Binarization | | |
|---|---|---|---|
| u | Prefix (unary) | Suffix (fixed length) | Suffix range |
| 0 | 0 | — | — |
| 1 | 10 | — | — |
| 2 | 110 | — | — |
| 3 | 1110 | — | — |
| 4-5 | 11110 | X | 0 to 1 |
| 6-9 | 111110 | XX | 0 to 3 |
| 10-17 | | XXX | 0 to 7 |
| . . . | . . . | . . . | . . . |

It will be understood that the process 500 can be applied to other coding types such as described in [V-DMC] Geometry displacement coding, ISO/IEC SC29 WG07 M60185, July 2022), which is incorporated by reference in its entirety as if fully set forth herein, and which describes using codes such as exponential Golomb in conjunction with run-length coding. In such cases, the concepts of using a positive_skew flag and the mapping from signed to unsigned symbols such as shown in Tables 3-4 may be used to code the non-zero symbols. In this case, after binarization, the bins are directly written to the bitstream without arithmetic coding, which can increase coding efficiency because arithmetic coding is not being used. This is because, if a sign is coded explicitly, it always uses one bit irrespective of the skewed statistics.

In some embodiments, the binarized set of values of the one or more samples can be coded using context-based arithmetic coding, such as described in incorporated U.S. patent application Ser. No. 18/447,191. For instance, in certain embodiments, values of two or more previous samples may be used as a context instead of a single value of the previous sample. In certain embodiments, the context to code $d_c^k(i)$ may be derived based on the values of $d_c^k(i-1)$ and $d_c^k(i-2)$. But if $M_c$ is large, the number of contexts $(2M_c+1)*(2M_c+1)$ may become very large, which can affect coding efficiency. The coding efficiency can be affected because the context model for a context may not be able to adapt to the final distribution as the number of samples coded with that context may be very small when adaptive arithmetic coding is used.

If fixed arithmetic coding is used, the overhead of transmitting the probability density functions for each context may become prohibitive. Hence, it may be desirable to reduce the number of contexts. For example, the $(2M_c+1)$ values can be mapped to a smaller subset. In certain embodiments, the absolute value may be used to derive the context. If values of two previous samples are used to derive the context, the number of contexts is reduced from $(2M_c+1)*(2M_c+1)$ to $(M_c+1)*(M_c+1)$ by using absolute values. In certain embodiments, the magnitude may be further clipped so that the number of contexts is reduced further. For example, the maximum magnitude can be clipped to 3 based on: $d_c^k(i-1) \rightarrow \min(|d_c^k(i-1)|, 3)$.

When values of two or more previous samples are used to derive the context, in one embodiment, the sum of absolute values, possibly clipped, may be used as a context. The context may depend on other components or level of detail signals instead of or in addition to previous samples from level of detail signal of a particular component. For example, if $d_x^k(i)$ and $d_y^k(i)$ have already been coded, the context for $d_z^k(i)$ may depend on the values of any of $d_x^k(i)$, $d_y^k(i)$, and $d_z^k(i-1)$ or any combination thereof.

Thus, when context-based coding is used, a detail signal encoding can be performed for encoding $d_c^k(i)$, $0 \le i < N^k$. For each sample, the samples from the context neighborhood can be fetched. The samples may be already coded samples from a same level of detail signal component, previously coded level of detail signals, or components as described previously. A context value, $C_i$, can thus be derived. The context value can be derived in an inclusive range from 0 to (W−1). The context can be based on one or more samples from a context neighborhood. For example, the context can be based on a previous sample, more than one previous sample, another component of the current sample in the context neighborhood, and a value for the corresponding sample from a previous LOD signal. The arithmetic encoding at step 508 can thus encode a current value $d_c^k(i)$, $0 \le i < N^k$ using the corresponding context, $C_i$, to produce the output bitstream.

At step 510, a compressed bitstream is produced. The compressed bitstream can be, for example, transmitted to an external device or to a storage on the electronic device 300. It will be understood that an LOD signal level can include any number of samples, and that the process can be repeated for each LOD signal level to map encode each LOD signal and map each LOD signal's displacement values to unsigned values, and perform binarization and coding of the values into the compressed bitstream. Also, for the samples at each displacement level, the skew flag can be used to indicate a positive or negative skew in various ways. For example, in some embodiments, a positive_skew flag is written to the bitstream for each component (x, y, z) of each LOD. That is, for each LOD, three flags are sent, one for each component of all samples in the LOD ($0 \le i < N^k$). If the entire LOD component is zero, the signaling of the positive_skew flag may be skipped. In some embodiments, a single positive_skew flag may be sent for each LOD. In such a case, the flag is shared by all the components of the LOD. That is, for each LOD, a skew flag is sent for all samples belonging to that LOD, and the skew flag applies to all components (x, y, z) of all samples ($0 \le i < N^k$) in the LOD.

In some embodiments, a positive_skew flag is signaled for each component, and the flag is shared by all the LODs for that component. That is, three flags could be sent (one for each component) for all LODs combined, such that each flag applies to a single component of all samples of all LODs. In some embodiments, a single positive_skew flag is signaled in the bitstream that is shared by all the components and LODs. That is, a single flag can be sent for all LODs combined, such that the flag applies all components of all samples of all LODs.

Although FIG. 5 illustrates an example displacement coding process 500, various changes may be made to FIG. 5. For example, while shown as a series of steps, various steps in FIG. 5 may overlap, occur in parallel, or occur any number of times.

Figure 6:
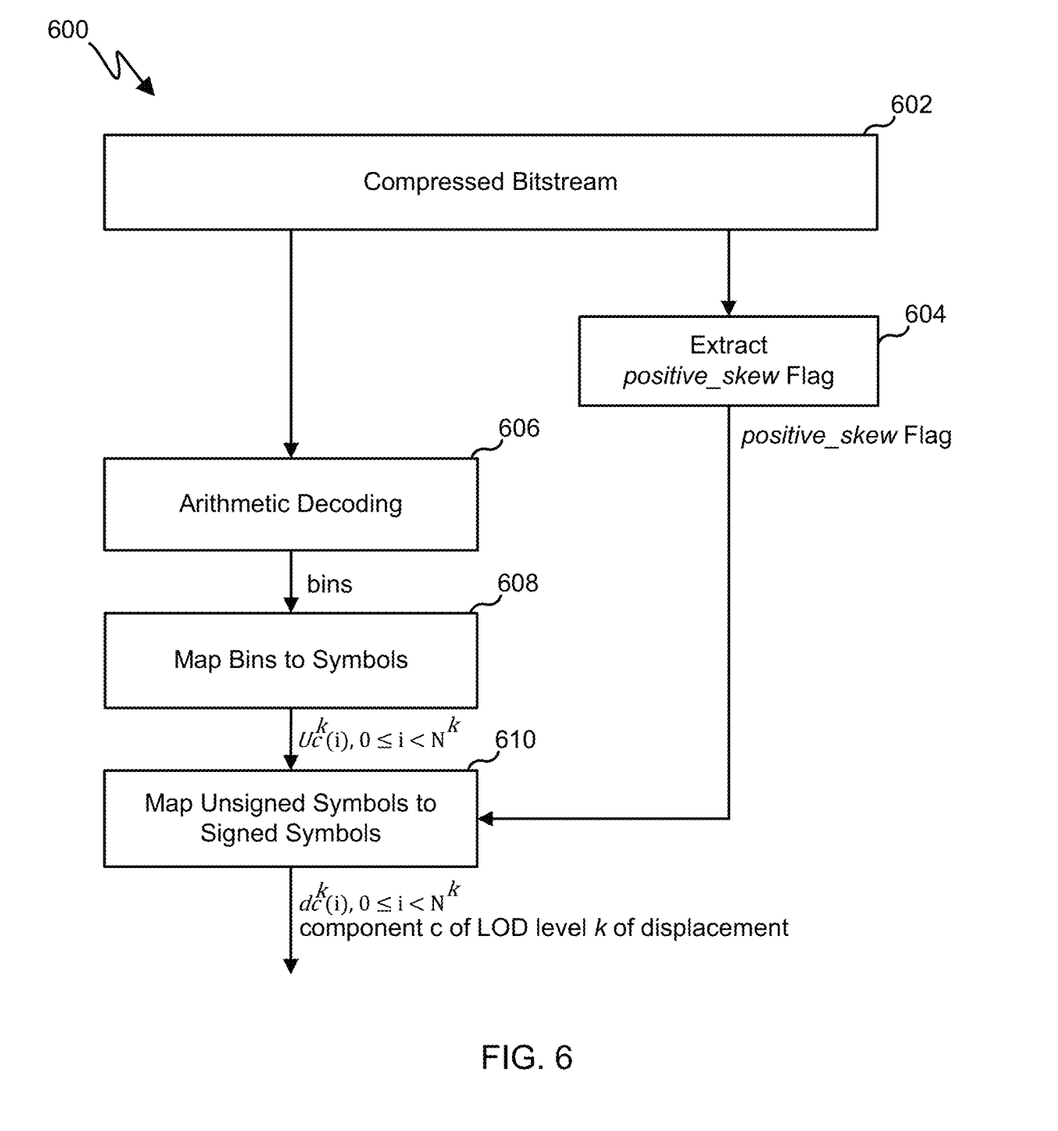
FIG. 6 illustrates an example displacement decoding process in accordance with this disclosure.

FIG. 6 illustrates an example displacement decoding process 600 in accordance with this disclosure. The process 600 illustrated in FIG. 6 is for illustration only. FIG. 6 does not limit the scope of this disclosure to any particular implementation of a displacement decoding process. For ease of explanation, the process 600 of FIG. 6 may be described as being performed using the electronic device 300 of FIG. 3. However, process 600 may be used with any other suitable system and any other suitable electronic device, such as the server 200.

As shown in FIG. 6, at step 602, a compressed bitstream is received. The compressed bitstream was created using a process to determine a positive_skew flag and convert displacement values to unsigned symbols, as described for example with respect to the process 500 of FIG. 5. The electronic device 300, upon receiving the compressed bitstream, can, at step 604, extract the positive_skew flag from the compressed bitstream so that the electronic device 300 is informed (or can infer) the mapping scheme used, that is, how the unsigned values u encoded in the bitstream map to their original displacement d values.

At step 606, the electronic device 300 performs arithmetic decoding to obtain the binarized unsigned values from the bitstream, and, at step 608, the electronic device 300 maps the bins to the unsigned symbols u to obtain the unsigned symbols from the binarized values. As described with respect to FIG. 5, the binarization used by the encoder and decoder can be exponential Golomb code, Golomb-Rice code, unary code, truncated unary code, or a concatenation of a Golomb Rice code and exponential Golomb code. For example, in some embodiments, a concatenation of Golomb Rice code of order 0 and exponential Golomb code of order 0 can be used. As also described with respect to FIG. 5, different transition points with respect to binarization for the u value can be used.

As also described with respect to FIG. 5, it will be understood that other coding types can be used, such as using codes such as exponential Golomb in conjunction with run-length coding. In such cases, the concepts of using a positive_skew flag and the mapping from signed to unsigned symbols such as shown in Tables 3-4 may be used to code the non-zero symbols. In this case, the bins are directly written to the bitstream without arithmetic coding, which can increase coding efficiency because arithmetic coding is not being used. This is because, if a sign is coded explicitly, it always uses one bit irrespective of the skewed statistics.

As also described with respect to FIG. 5, context-based arithmetic coding can also be used. In such cases, a detail signal decoding can be performed for decoding $d_c^k(i)$, $0 \le i < N^k$. For each i, $0 \le i < N^k$ in the compressed bitstream, the already decoded samples from the context neighborhood are fetched. These may be already decoded samples from the same level of detail signal component, previously coded level of detail signals or components as described previously. Then the context derivation block derives the context value, $C_i$. The context value can be derived in an inclusive range from 0 to (W−1). The arithmetic decoding operation thus decodes the component of the LOD signal, $d_c^k(i)$, $0 \le i < N^k$ using the input bitstream and the corresponding context, $C_i$.

Once decoding of the binarized values is performed at step 606, and the binarized values are mapped to unsigned symbols at step 608, the electronic device obtains all values u for each component of the samples in the LOD signal ($u_c^k(i)$, $0 \le i < N^k$). As described in this disclosure, the positive_skew flag can be used in various ways, such as using three flags (one for each component) of the samples of an LOD, one flag for all three components of the samples of an LOD, three flags for (one for each component) of the samples of all LODs, or one flag for all three components of all LODs.

At step 610, the electronic device maps the unsigned symbols to signed symbols using a mapping scheme such as that described with respect to FIG. 5 and Table 2. The electronic device thus can obtain the original values d for the displacements as part of the process of decoding the compressed bitstream. Once decoding is complete, the electronic device 300 can output the decoded content for display, or transmit the decoded content to another device.

Although FIG. 6 illustrates an example displacement decoding process 600, various changes may be made to FIG. 6. For example, while shown as a series of steps, various steps in FIG. 6 may overlap, occur in parallel, or occur any number of times.

Figure 7:
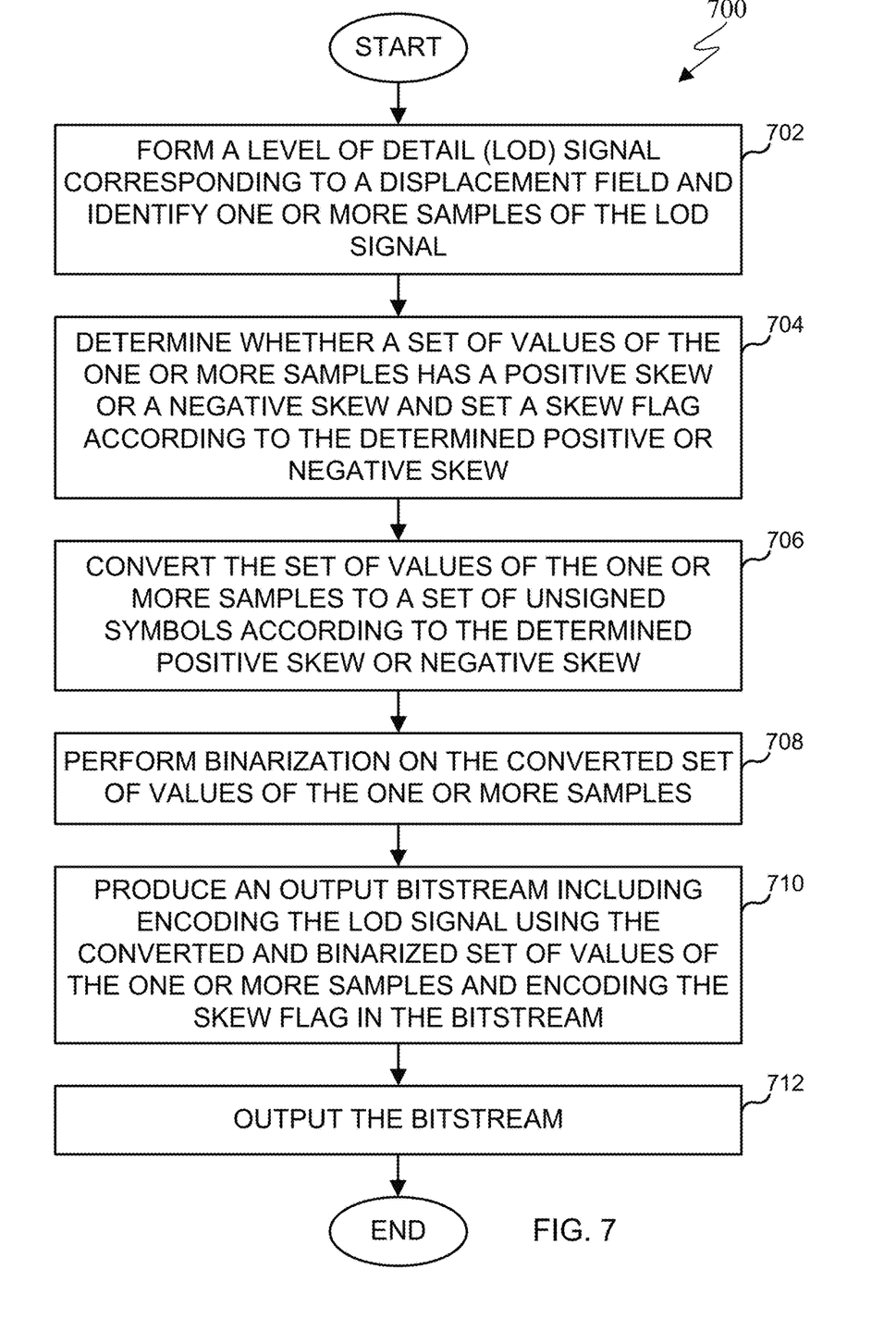
FIG. 7 illustrates an example encoding method for improved coding of displacements using a skew flag in accordance with this disclosure.

FIG. 7 illustrates an example encoding method 700 for improved coding of displacements using a skew flag in accordance with this disclosure. For ease of explanation, the method 700 of FIG. 7 is described as being performed using the electronic device 300 of FIG. 3. However, the method 700 may be used with any other suitable system and any other suitable electronic device.

As shown in FIG. 7, at step 702, the electronic device 300 forms a level of detail (LOD) signal corresponding to a displacement field. The LOD signal can be formed based on performing one or more levels of a wavelet transform 410 on displacements 408 of a mesh-frame. The electronic device 300 then identifies one or more samples in the LOD signal. A number of samples $N^k$ can be included for each level k in the LOD signal. A sample includes component values (x, y, z).

At step 704, the electronic device determines whether a set of values (e.g., one or more of the component (x, y, z) values) of the one or more samples has a positive skew or a negative skew and sets a skew flag according to the determined positive or negative skew. As described in this disclosure, the positive or negative skew can be determined by analyzing the histograms of quantized LOD signals to find out whether the distribution of component values is skewed in the positive or negative direction.

At step 706, the electronic device 300 converts the set of values of the one or more samples to a set of unsigned symbols according to the determined positive skew or negative skew, such as described in this disclosure with respect to FIG. 5. For example, to convert the set of values of the one or more samples to the set of unsigned symbols, the electronic device 300 performs a mapping of each value of the set of values to the set of unsigned symbols. For instance, as described in this disclosure, the value of the skew flag can alter the mapping of each value of the set of values of the one or more samples to the set of unsigned symbols, such that the mapping is different depending on whether the set of values skew positive or negative.

At step 708, the electronic device 300 performs binarization on the converted set of values of the one or more samples to convert the unsigned values to binary values. For example, to perform the binarization on the set of values of the one or more samples based on the set of unsigned symbols, the electronic device 300 can set a transition point based on the set of unsigned symbols at which the binarization switches from using a first binary coding type to a second binary coding type. Also, as described in this disclosure, the binarized set of values of the one or more samples can be coded using context-based arithmetic coding.

At step 710, the electronic device 300 produces an output bitstream, where producing the output bitstream includes encoding the LOD signal using the converted and binarized set of values of the one or more samples into the bitstream and encoding the skew flag into the bitstream for use by a decoder. At step 712, the electronic device 300 outputs the bitstream. This output bitstream can include the compressed base mesh bitstream, the displacement bitstream, and the attributes bitstream shown for example in FIG. 4, as well as the signaling elements, including the skew flag, described above. The output bitstream can be transmitted to an external device or to a storage on the electronic device 300.

The skew flag can be used in various ways. For example, as described in this disclosure, the LOD signal can include multiple components, and the set of values of the one or more samples can be associated with one of the multiple components. Thus, in some embodiments, a skew flag can pertain to one component of the one or more samples (e.g., the x component). For example, in some embodiments, three skew flags can be used, one for each component, to separately indicate whether the x values skew positive or negative, whether the y values skew positive or negative, and whether the z values skew positive or negative. For example, when flags are used for each component, the method 700 can further include that the electronic device 300 determines whether another set of values of the one or more samples has a positive skew or a negative skew, wherein the another set of values is associated with another one of the multiple components, converts the another set of values of the one or more samples to another set of unsigned symbols according to the determined positive skew or negative skew of the another set of values, performs binarization on the converted another set of values of the one or more samples, and produces an output bitstream by encoding the LOD signal using the converted and binarized another set of values of the one or more samples.

As another example, in some embodiments, a single positive_skew flag may be sent for each LOD. In such a case, the flag is shared by all the components of the LOD. That is, for each LOD, a skew flag is sent for all samples belonging to that LOD, and the skew flag applies to all components (x, y, z) of all samples ($0 \le i < N^k$) in the LOD. In some embodiments, a positive_skew flag is signaled for each component, and the flag is shared by all the LODs for that component. That is, three flags could be sent (one for each component) for all LODs combined, such that each flag applies to a single component of all samples of all LODs. In some embodiments, a single positive_skew flag is signaled in the bitstream that is shared by all the components and LODs. That is, a single flag can be sent for all LODs combined, such that the flag applies all components of all samples of all LODs.

Although FIG. 7 illustrates one example of an encoding method 700 for improved coding of displacements using a skew flag, various changes may be made to FIG. 7. For example, while shown as a series of steps, various steps in FIG. 7 may overlap, occur in parallel, or occur any number of times.

Figure 8:
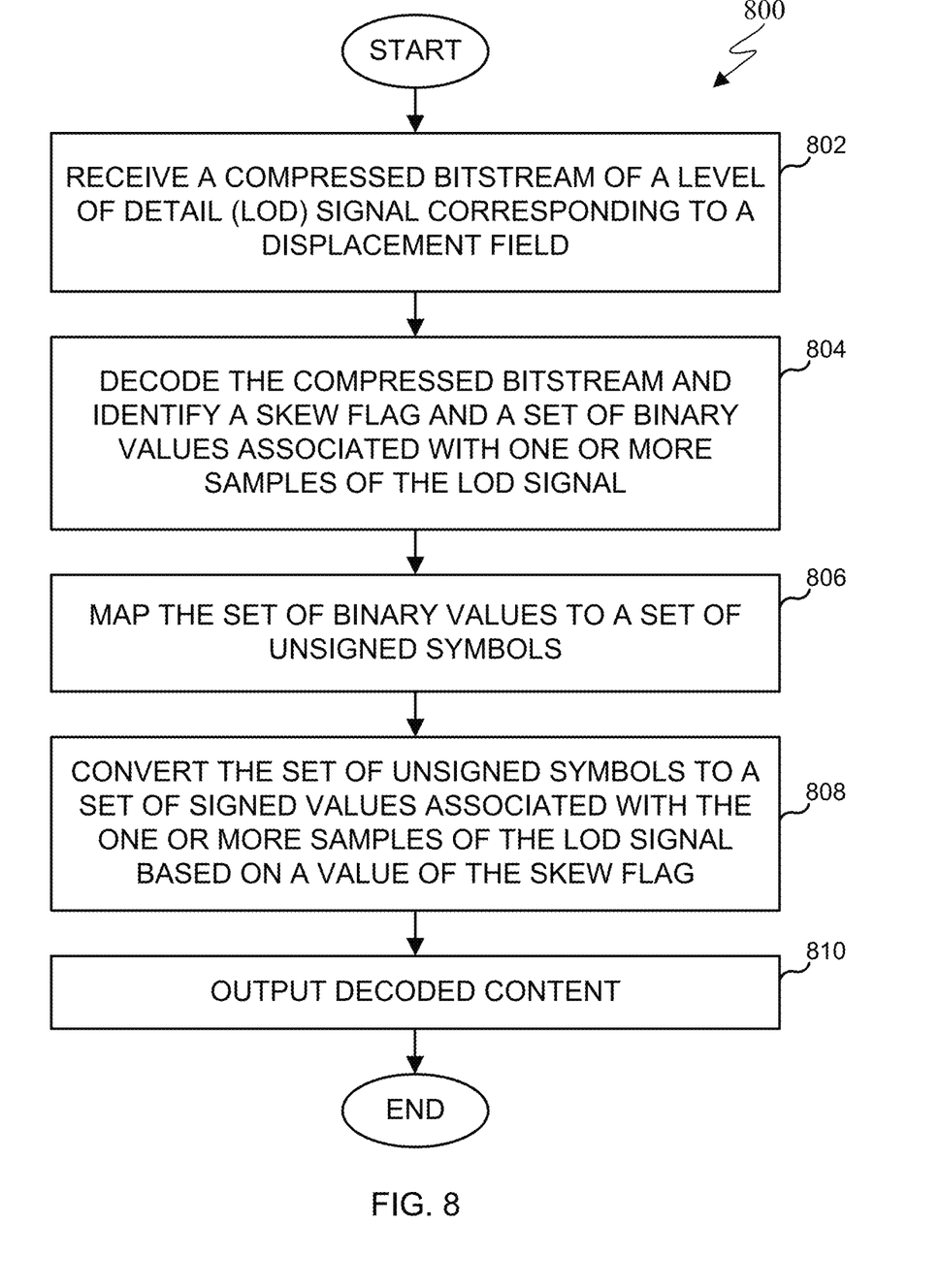
FIG. 8 illustrates an example decoding method for improved coding of displacements using a skew flag in accordance with this disclosure.

FIG. 8 illustrates an example decoding method 800 for improved coding of displacements using a skew flag in accordance with this disclosure. For ease of explanation, the method 800 of FIG. 8 is described as being performed using the electronic device 300 of FIG. 3. However, the method 800 may be used with any other suitable system and any other suitable electronic device.

As shown in FIG. 8, at step 802, the electronic device 300 receives a compressed bitstream of a level of detail (LOD) signal corresponding to a displacement field. At step 804, the electronic device 300 decodes the compressed bitstream and identifies a skew flag from the compressed bitstream and a set of binary values associated with one or more samples of the LOD signal. As described in this disclosure, in some embodiments, the binary set of values can be decoded using context-based arithmetic coding.

At step 806, the electronic device 300 maps the set of binary values to a set of unsigned symbols. At step 808, the electronic device 300 converts the set of unsigned symbols to a set of signed values associated with the one or more samples of the LOD signal based on a value of the skew flag. In various embodiments, to convert the set of unsigned symbols to the set of signed values associated with the one or more samples, the electronic device 300 can perform a mapping of each symbol of the set of unsigned symbols to the set of signed values. In various embodiments, the skew flag is used to determine the positive skew or the negative skew, and a value of the skew flag alters the mapping of each symbol of the set of unsigned symbols to the set of signed values.

In various embodiments, the LOD signal includes multiple components, and the set of signed values associated with the one or more samples are associated with one of the multiple components. In various embodiments, the electronic device 300 can map another set of binary values from the decoded compressed bitstream associated with the one or more samples to another set of unsigned symbols, and convert the another set of unsigned symbols to another set of signed values based on the value of the skew flag, wherein the another set of signed values is associated with another one of the multiple components of the LOD signal. As described in this disclosure, the positive_skew flag can be used in various ways, such as using three flags (one for each component) of the samples of an LOD, one flag for all three components of the samples of an LOD, three flags for (one for each component) of the samples of all LODs, or one flag for all three components of all LODs.

At step 810, the electronic device 300 outputs the decoded content associated with the encoded content in the compressed bitstream previously received. The output decoded content can be, for example, transmitted to an external device or to a storage on the electronic device 300.

Although FIG. 8 illustrates one example of a decoding method 800 for improved coding of displacements using a skew flag, various changes may be made to FIG. 8. For example, while shown as a series of steps, various steps in FIG. 8 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface; and
a processor operably coupled to the communication interface, the processor configured to:
form a level of detail (LOD) signal corresponding to a displacement field;
identify one or more samples of the LOD signal;
determine whether a set of values of the one or more samples has a positive skew or a negative skew and set a skew flag according to the determined positive or negative skew;
convert the set of values of the one or more samples to a set of unsigned symbols according to the determined positive skew or negative skew;
perform binarization on the converted set of values of the one or more samples; and
produce an output bitstream including encoding the LOD signal using the converted and binarized set of values of the one or more samples and encoding the skew flag in the output bitstream.

2. The apparatus of claim 1, wherein, to convert the set of values of the one or more samples to the set of unsigned symbols, the processor is further configured to perform a mapping of each value of the set of values to the set of unsigned symbols.

3. The apparatus of claim 2, wherein a value of the skew flag alters the mapping of each value of the set of values of the one or more samples to the set of unsigned symbols.

4. The apparatus of claim 1, wherein the LOD signal includes multiple components, and wherein the set of values of the one or more samples is associated with one of the multiple components.

5. The apparatus of claim 4, wherein the processor is further configured to:

determine whether another set of values of the one or more samples has a positive skew or a negative skew, wherein the another set of values is associated with another one of the multiple components;

convert the another set of values of the one or more samples to another set of unsigned symbols according to the determined positive skew or negative skew of the another set of values;

perform binarization on the converted another set of values of the one or more samples; and produce the output bitstream by encoding the LOD signal using the converted and binarized another set of values of the one or more samples.

6. The apparatus of claim 1, wherein, to perform the binarization on the set of values of the one or more samples based on the set of unsigned symbols, the processor is further configured to set a transition point based on the set of unsigned symbols at which the binarization switches from using a first binary coding type to a second binary coding type.

7. The apparatus of claim 1, wherein the binarized set of values of the one or more samples are coded using context-based arithmetic coding.

8. A method comprising:

forming a level of detail (LOD) signal corresponding to a displacement field;

identifying one or more samples of the LOD signal;

determining whether a set of values of the one or more samples has a positive skew or a negative skew and setting a skew flag according to the determined positive or negative skew;

converting the set of values of the one or more samples to a set of unsigned symbols according to the determined positive skew or negative skew;

performing binarization on the converted set of values of the one or more samples; and producing an output bitstream including encoding the LOD signal using the converted and binarized set of values of the one or more samples and encoding the skew flag in the output bitstream.

9. The method of claim 8, wherein converting the set of values of the one or more samples to the set of unsigned symbols includes performing a mapping of each value of the set of values to the set of unsigned symbols.

10. The method of claim 9, wherein a value of the skew flag alters the mapping of each value of the set of values of the one or more samples to the set of unsigned symbols.

11. The method of claim 8, wherein the LOD signal includes multiple components, and wherein the set of values of the one or more samples is associated with one of the multiple components.

12. The method of claim 11, further comprising:

determining whether another set of values of the one or more samples has a positive skew or a negative skew, wherein the another set of values is associated with another one of the multiple components;

converting the another set of values of the one or more samples to another set of unsigned symbols according to the determined positive skew or negative skew of the another set of values;

performing binarization on the converted another set of values of the one or more samples; and producing the output bitstream by encoding the LOD signal using the converted and binarized another set of values of the one or more samples.

13. The method of claim 8, wherein performing the binarization on the set of values of the one or more samples based on the set of unsigned symbols includes setting a transition point based on the set of unsigned symbols at which the binarization switches from using a first binary coding type to a second binary coding type.

14. The method of claim 8, wherein the binarized set of values of the one or more samples are coded using context-based arithmetic coding.

15. An apparatus comprising:

a communication interface; and a processor operably coupled to the communication interface, the processor configured to:

receive a compressed bitstream of a level of detail (LOD) signal corresponding to a displacement field;

decode the compressed bitstream and identify a skew flag and a set of binary values associated with one or more samples of the LOD signal;

map the set of binary values to a set of unsigned symbols; and convert the set of unsigned symbols to a set of signed values associated with the one or more samples of the LOD signal based on a value of the skew flag.

16. The apparatus of claim 15, wherein, to convert the set of unsigned symbols to the set of signed values associated with the one or more samples, the processor is further configured to perform a mapping of each symbol of the set of unsigned symbols to the set of signed values.

17. The apparatus of claim 16, wherein:

the skew flag is used to determine the positive skew or the negative skew; and a value of the skew flag alters the mapping of each symbol of the set of unsigned symbols to the set of signed values.

18. The apparatus of claim 15, wherein the LOD signal includes multiple components, and wherein the set of signed values associated with the one or more samples are associated with one of the multiple components.

19. The apparatus of claim 18, wherein the processor is further configured to:

map another set of binary values from the decoded compressed bitstream associated with the one or more samples to another set of unsigned symbols; and convert the another set of unsigned symbols to another set of signed values based on the value of the skew flag, wherein the another set of signed values is associated with another one of the multiple components of the LOD signal.

20. The apparatus of claim 15, wherein the binary set of values is decoded using context-based arithmetic coding.

* * * * *